(12) United States Patent
Wang (10) Patent No.: US 6,685,110 B2
(45) Date of Patent: Feb. 3, 2004

(54) ACTUATION MECHANISM FOR A PUSHBUTTON CONTROLLED SPRINKLER

(76) Inventor: Tzu-Meng Wang, No. 91, Kwo-Tai Rd., Chu-Nan Chen, Miao-Li Hsien (TW)

( * ) Notice: Subject to any disclaimer, the term of this patent is extended or adjusted under 35 U.S.C. 154(b) by 198 days.

(21) Appl. No.: 10/011,923

(22) Filed: Oct. 30, 2001

(65) Prior Publication Data

US 2002/0043572 A1 Apr. 18, 2002

Related U.S. Application Data

(63) Continuation-in-part of application No. 09/604,496, filed on Jun. 27, 2000, now Pat. No. 6,352,212.

(51) Int. Cl.$^7$ .............................. B05B 7/02; B05B 9/01; B05B 15/08; B05B 1/30
(52) U.S. Cl. ...................... 239/526; 239/525; 239/588; 239/569
(58) Field of Search .................. 239/525, 526, 239/583, 586, 394, 443, 569, 576, 579, 582.1, 588, DIG. 12

(56) References Cited

U.S. PATENT DOCUMENTS 5,967,422 A * 10/1999 Wang ......................... 239/526
5,971,299 A * 10/1999 Loschelder et al. .......... 239/526
6,000,626 A * 12/1999 Futo et al. ..................... 239/74
6,173,911 B1 * 1/2001 Hui-Chen .................... 239/526
6,260,774 B1 * 7/2001 Erickson ...................... 239/526
6,352,212 B1 * 3/2002 Wang .......................... 239/390

* cited by examiner

*Primary Examiner*—Davis D. Hwu
(74) *Attorney, Agent, or Firm*—Jackson Walker L.L.P.

(57) ABSTRACT

An actuation mechanism is used with a sprinkler to allow water to flow out of the sprinkler or to shut off the flow of water. Rather than a conventional trigger, the activation mechanism uses a pushbutton assembly that can be toggled open or closed. This allows the person directing the sprinkler to use the sprinkler without undue stress on the hand and fingers from having to squeeze the conventional trigger. The actuation mechanism is comprised of a pushbutton, a guiding member, a limiting sleeve and a shell. The pushbutton, guiding member and limiting sleeve are housed in the shell. The pushbutton is attached to the guide member that selectively slides in the limiting sleeve. A connecting rod attached to the guiding member interfaces with the valve in the sprinkler and actuates the flow of water.

16 Claims, 7 Drawing Sheets

ACTUATION MECHANISM FOR A PUSHBUTTON CONTROLLED SPRINKLER

CROSS REFERENCE

The application is a continuation in part (CIP) filed by the applicant of the patent application Ser. No. 09/604,496 ('496) filed Jun. 27, 2000 now U.S. Pat. No. 6,352,212. The content of '496 application is taken for reference hereinafter.

BACKGROUND OF THE INVENTION

1. Field of the Invention

The present invention relates to an actuation mechanism, and more particularly to the actuation mechanism for a pistol-grip sprinkler having a body with an inlet, an outlet, a control chamber defined to communicate with the outlet and to hold the actuation mechanism to control the water flow.

2. Description of Related Art

Sprinklers, especially for use in gardening and washing applications, are widely used throughout the world. The currently available sprinkler normally has a handle with a hose attached to the inlet, a spray head at the outlet and a trigger pivotally connected to the handle to control the flow of water through the sprinkler. The design of the sprinkler is not suitable for a user to operate for a long period of time because the user will have to apply a force to the trigger continuously, which causes muscle fatigue. To solve the problem, a trigger lock is provided to keep the sprinkler open to continuously keep the sprinkler in operation and solve the muscle fatigue problem. Although, the design meets the user's requirement, the design still has its shortcoming. Obviously, hand sizes vary all over the world, and median and average hand sizes differ from one country or continent to another. If sprinklers are made to one international size, users in one region may find the handle too small while those elsewhere might find it too big. Thus, some users will find it very difficult to apply a force properly and comfortably. Furthermore, sprinkler manufacturers are not like shoemakers that are able to make shoes according to the customers' different requirements and sizes. Sprinkler manufacturers can only make sprinklers in one size, which makes use of a conventional sprinkler inconvenient to different users. A U.S. patent application filed by the applicant of this application, which has an application number of U.S. Pat. No. 09/604,496 and is considered to be the most relevant the application, is now taken for reference.

To overcome the shortcomings, the present invention tends to provide an improved actuation mechanism to mitigate and obviate the aforementioned problems.

SUMMARY OF THE INVENTION

The primary objective of the invention is to provide an improved sprinkler having a control chamber to hold an actuation mechanism to control the water flow, such that the user will not have to depress the trigger during the entire operation process. The actuation mechanism is able to maintain the sprinkler fixed in one particular state during operation. Therefore, the sprinkler having a pushbutton undoubtedly makes operation of the sprinkler more convenient and comfortable to the user.

Other objects, advantages and novel features of the invention will become more apparent from the following detailed description when taken in conjunction with the accompanying drawings.

DETAILED DESCRIPTION OF PREFERRED EMBODIMENT

Figure 1:
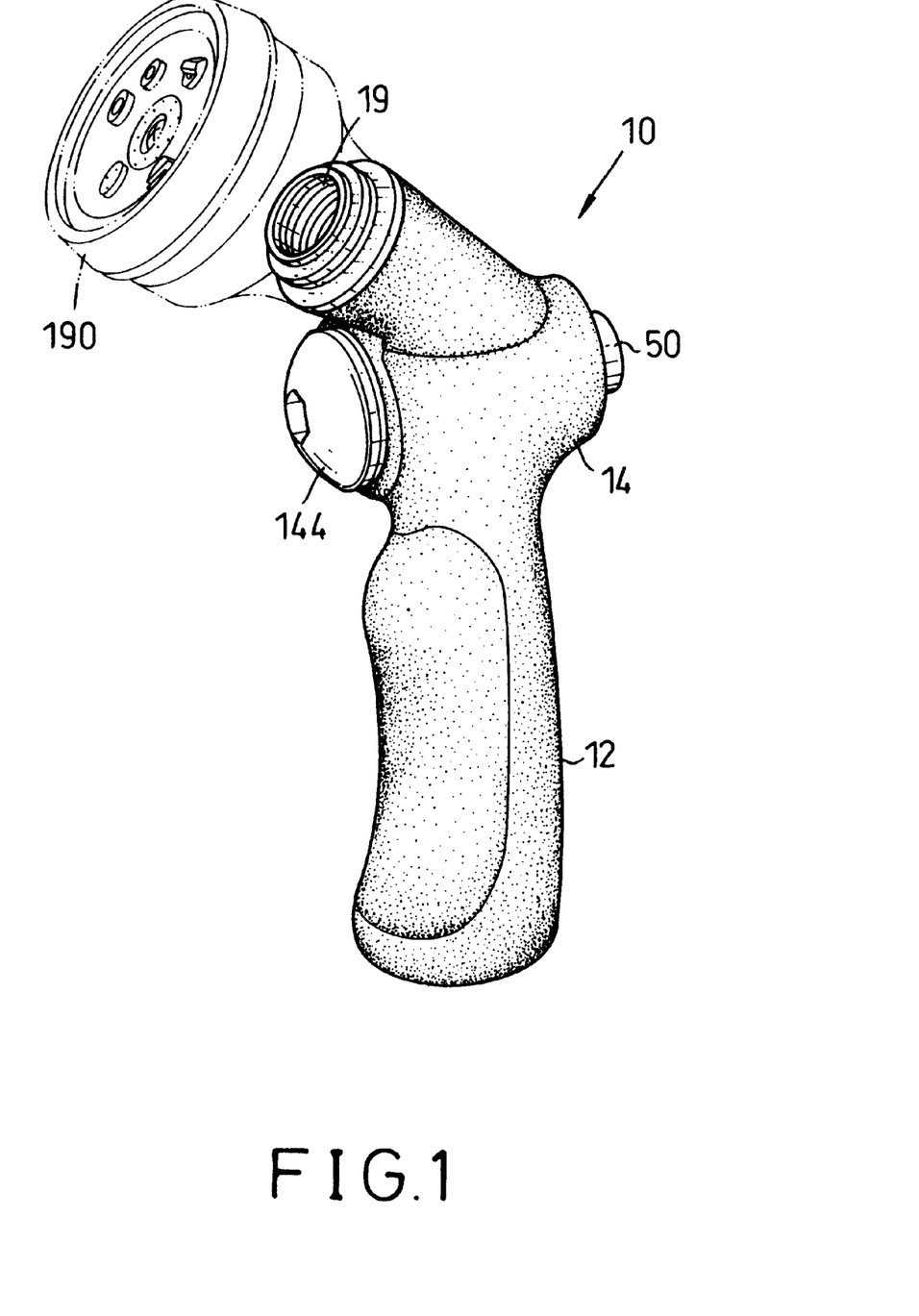
FIG. 1 is a perspective view of a pushbutton controlled sprinkler with an actuation mechanism in accordance with the present invention.
Figure 2:
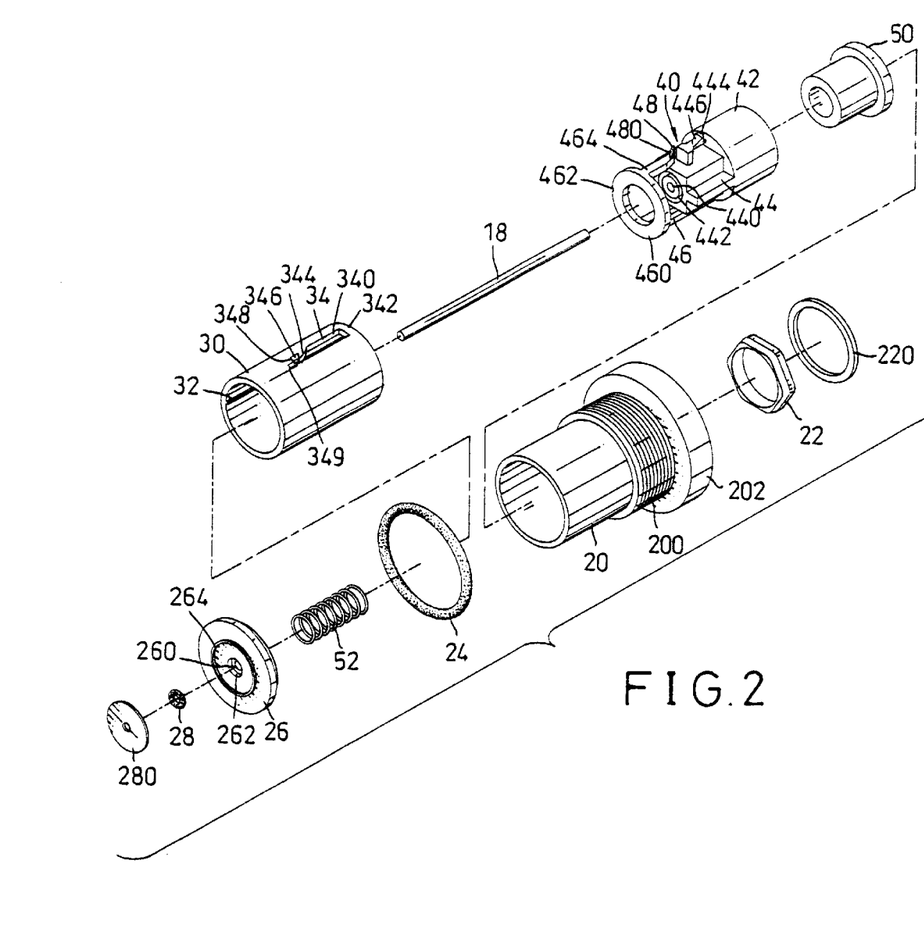
FIG. 2 is an exploded perspective view of the actuation mechanism in accordance with the present invention.

With reference to FIGS. 1 and 2, a sprinkler (10) in accordance with the present invention has a body (12), a chamber (14) defined in the body (12), a pushbutton (50) received in a first end of the chamber (14), and a piston assembly (16) received in a second end of the chamber (14).

Figure 11:
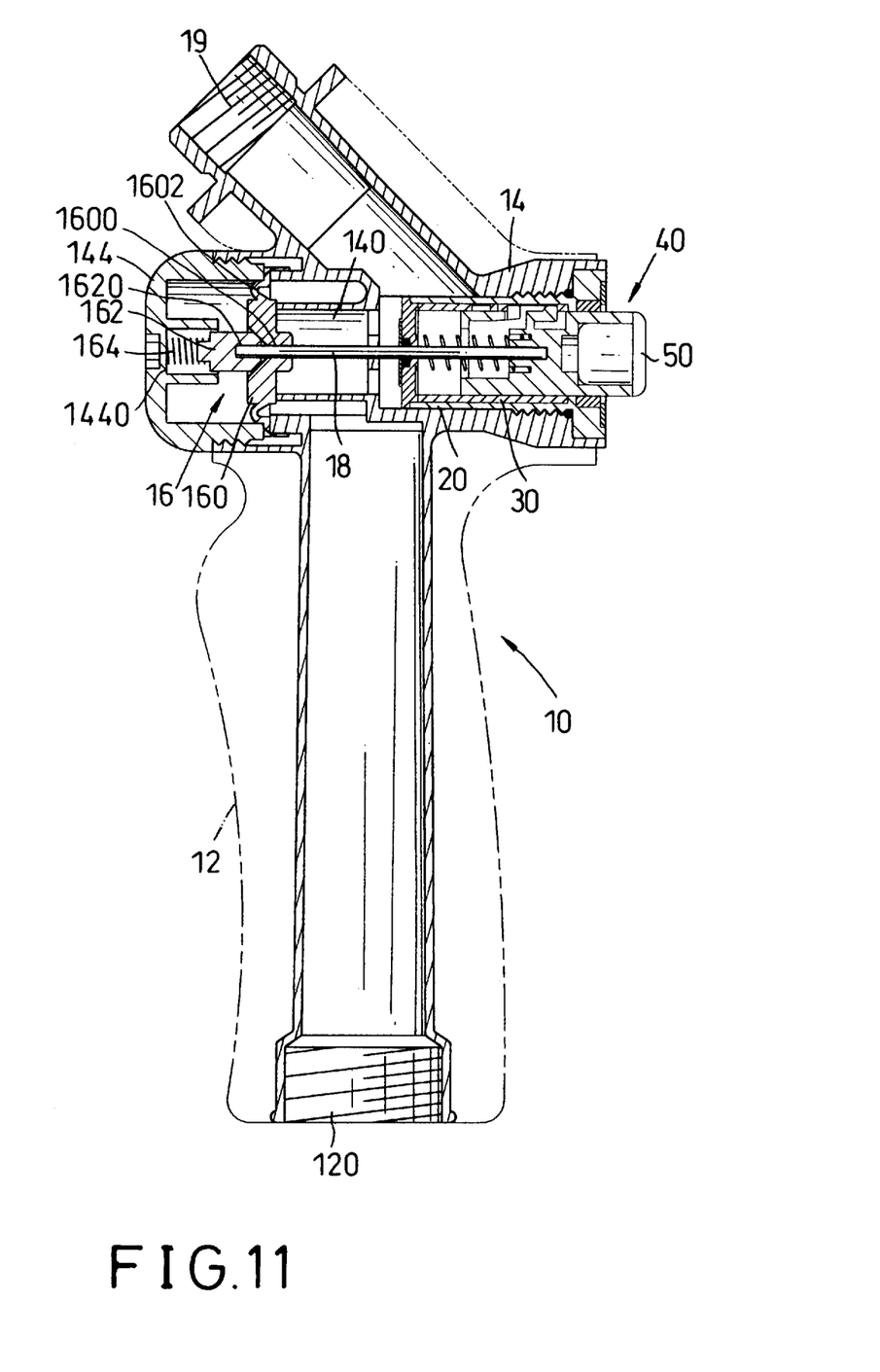
FIG. 11 illustrates a side elevation view of the push button controlled sprinkler with an activation mechanism in accordance with the present invention in a closed or shut position.
Figure 12:
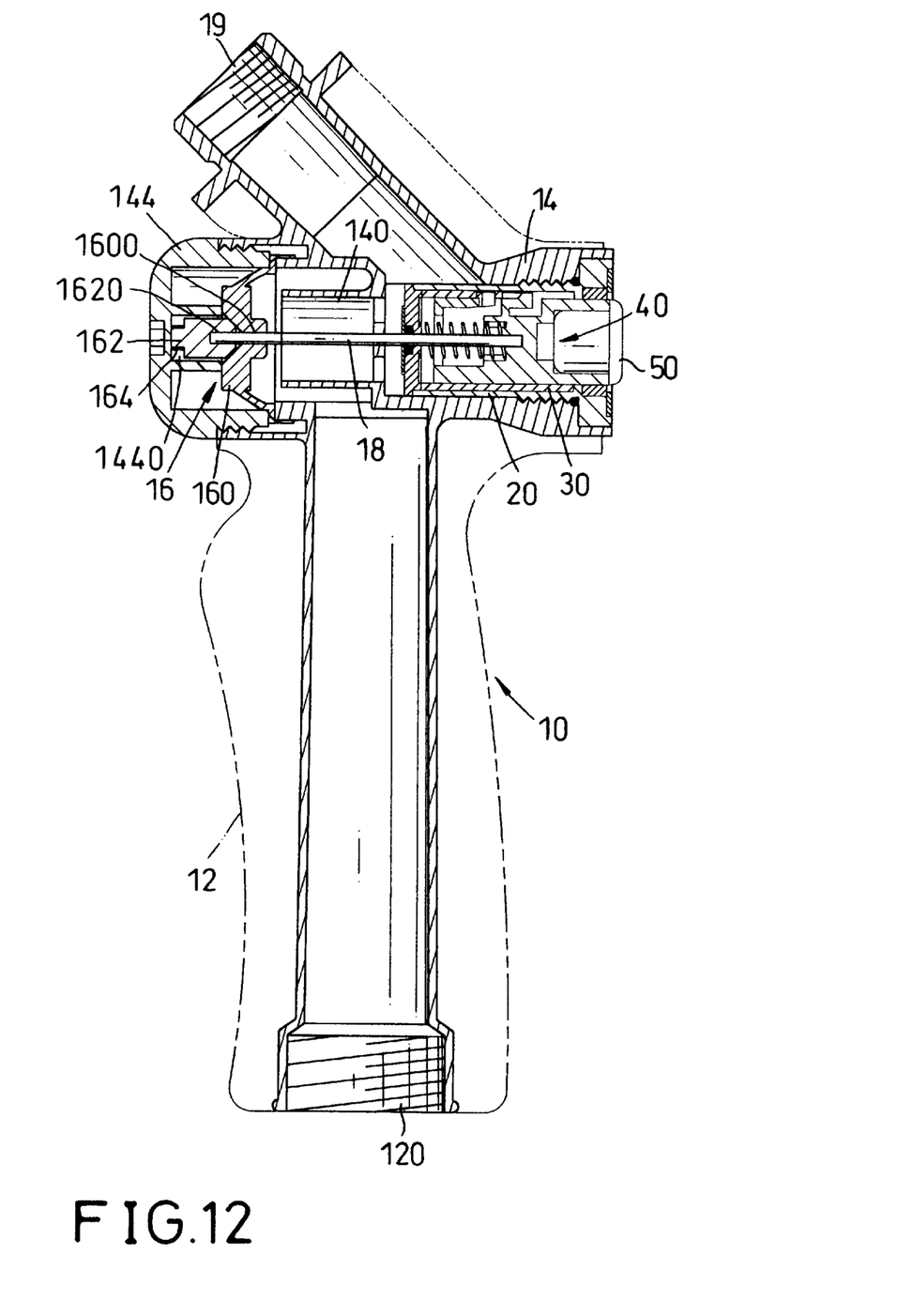
FIG. 12 is a side elevation view of the sprinkler of FIG. 11 in the open or on position.

The body (12) has an inlet (120), as shown in FIGS. 11 and 12 to connect to a water source, an outlet (19) to connect a spraying device (190), such as a sprinkler, and a cover (144) over the second end of the chamber (14).

The actuation mechanism is received in the chamber (14) and is controlled by the pushbutton (50). The actuation mechanism is received in a shell (20) and comprises a limiting sleeve (30), a guiding member (40) and the pushbutton (50).

Figure 3:
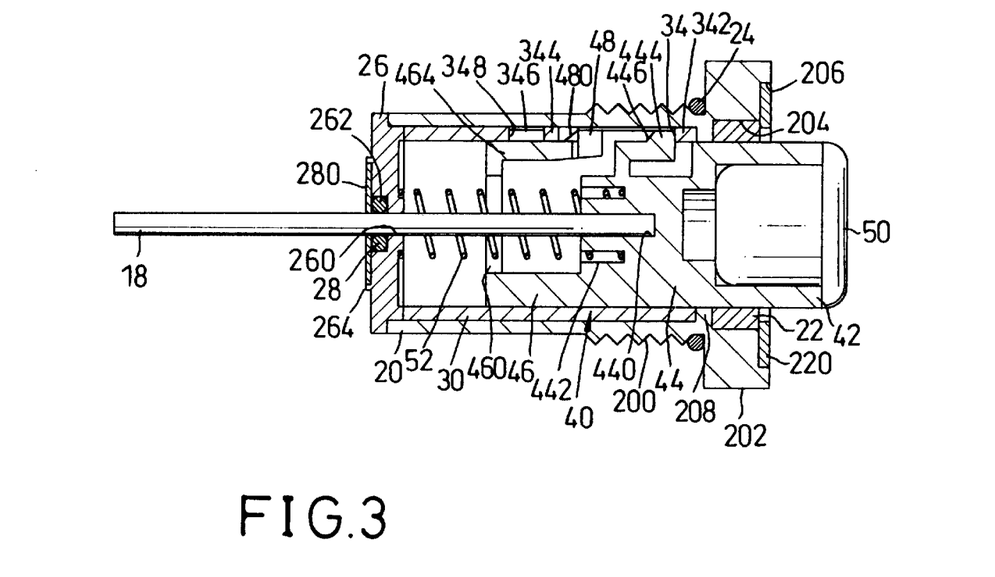
FIG. 3 is a side plan view in partial section of the actuation mechanism in FIG. 2 not actuated.

With reference to FIGS. 2 and 3, the shell (20) is tubular with an inner and outer surface and includes open proximal and distal ends, an outer thread (200), a flange (202), an annular recess (204), a positioning recess (206) and an annular stop (208). The outer thread (200) is formed on the outer surface of the shell (20). The flange (202) has an inner face and is formed on one end of the shell (20). The annular recess (204) is formed in the inner face of the flange (202). The positioning recess (206) defined in the inner face of the flange (202) and close to the distal end of the shell (20). The annular stop (208) is formed at an inside edge of the annular recess (204). A first ring (22) is mounted in the annular recess (204), and a positioning ring (220) is pressed into the positioning recess (206) to firmly retain the first ring (22) in the annular recess (204). An O-ring (24) is securely mounted around the shell (20) and abuts the flange (202). When the shell (20) is assembled in the body (10), the O-ring (24) provides the necessary seal. A cap (26) with a central hole (260) covers the open proximal end of the shell (20). A step (262) is formed in an inner side face defining the hole (260) to hold a washer (28) inside the hole (260) and a circular lip (264) is formed on one side of the cap (26) to securely hold a cover (280). The cover (280) is held in the circular lip (264) by any known soldering technique.

The limiting sleeve (30) is a tube like member with an inner and outer face and has a longitudinal key (32) formed on the inner face of the limiting sleeve (30). A longitudinal limit slot (34) is defined through the limiting sleeve (30) and includes a wide slot (340) with a limiting end (342) and a narrow slot (346) communicating with the wide slot (340) and having a width smaller than that of the wide slot (340). A hook (344) is formed between the wide and narrow slots (340, 346), and a limiting block (348) is formed on the opposite end of the limit slot (34) from the limiting end (342). A space (349) is thus defined between the limiting block (348) and a side face of the limit slot (34).

The guiding member (40) has a pushbutton seat (42) and a connecting rod seat (44) with an extension plate (46) extending out from a free end face of the connecting rod seat (44). The connecting rod seat (44) has a connecting rod hole (440) to hold a part of a connecting rod (18) and a spring recess (442) defined around the connecting rod hole (440). A stop (444) is integrally formed on the connecting rod seat (44) and has a sloping face (446). A ring (460) is formed at the free end of the extension plate (46) and has a resilient plate (464) extending toward the pushbutton seat (42). A longitudinal keyway (462) is defined in the ring (460) to correspond to the longitudinal key (32) in the limiting sleeve (30). A guide (48) is formed at the free end of the extension plate (464) and has an inclined face (480) complimentary to the hook (344). The pushbutton (50) is mounted at the end of the pushbutton seat (42) opposite to the end where the connecting rod seat (44) is installed. A spring (52) is compressibly mounted between the spring recess (442) and the cap (26).

Figure 4:
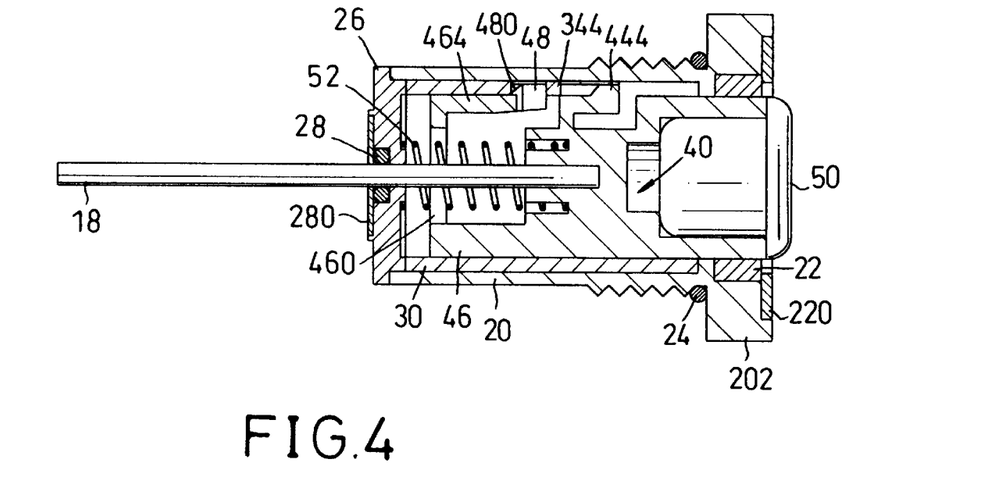
FIG. 4 is a side plan view in partial section of the actuation mechanism in FIG. 2 actuated.

With reference to FIGS. 3 and 4, the limiting sleeve (30) and the guiding member (40) are assembled by aligning the longitudinal keyway (462) and the key (32) and inserting the connecting rod seat (44) into the limiting sleeve (30). The longitudinal keyway (462) and the key (32) ensure that there is no relative rotation between the guiding member (40) and the limiting sleeve (30). When the connecting rod seat (44) is gradually inserted into the limiting sleeve (30), the sloping face (446) of the stop (444) facilitates the inserting of the guiding member (40) into the limiting sleeve (30). That is, the sloping face (446) engages the end face of the limiting sleeve (30) so the engagement between the limiting sleeve (30) and the guiding member (40) is smooth. Then, one end of the connecting rod (18) is securely mounted in the connecting rod hole (440), and the spring (52) is mounted around the connecting rod (18). The other end of the connecting rod (18) is passed through the hole (260) in the cap (26). The spring (52) abuts the connecting rod seat (44) and the cap (26). When the connecting rod seat (44) is gradually inserted into the limiting sleeve (30), the inclined face (480) of the guide (48) and the sloping face (446) of the stop (444) allow the stop (444) and the guide (48) to be received in the limit slot (34).

The final step in the assembly of the actuation mechanism is the insertion of the combination of the limiting sleeve (30) and the guiding member (40) into the shell (20). Therefore, when one distal end of the limiting sleeve (30) engages the annular stop (208) that stops the limiting sleeve (30) from moving any further out of the shell (20), the assembly of the actuation mechanism is complete.

With reference to FIGS. 5 to 10, the movement between the limiting sleeve (30) and the guiding member (40), that is, the open and close of the chamber (14) of the sprinkler, is illustrated.

Figure 5:
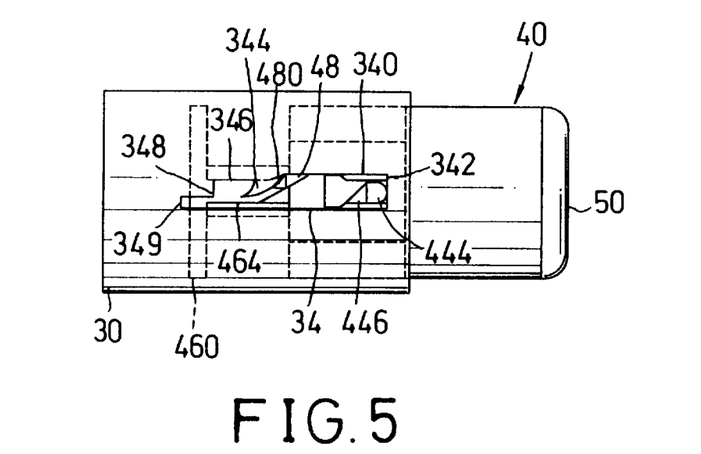
FIGS. 5 to 10 are operational top plan views of the actuation mechanism in FIG. 2 showing the relationship between the guiding member and the limiting sleeve in various states of actuation.
Figure 6:
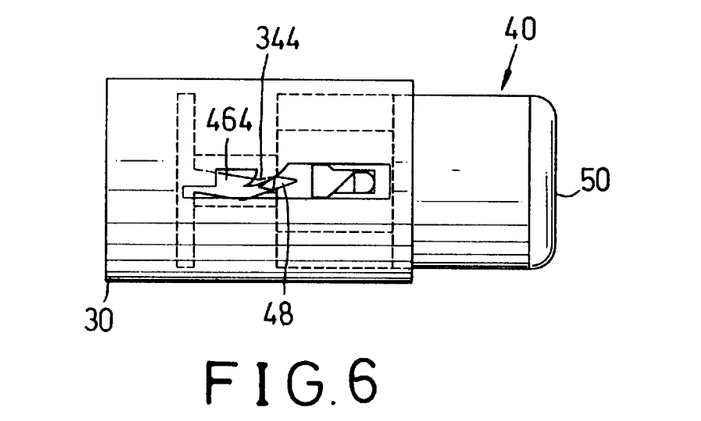
Figure 7:
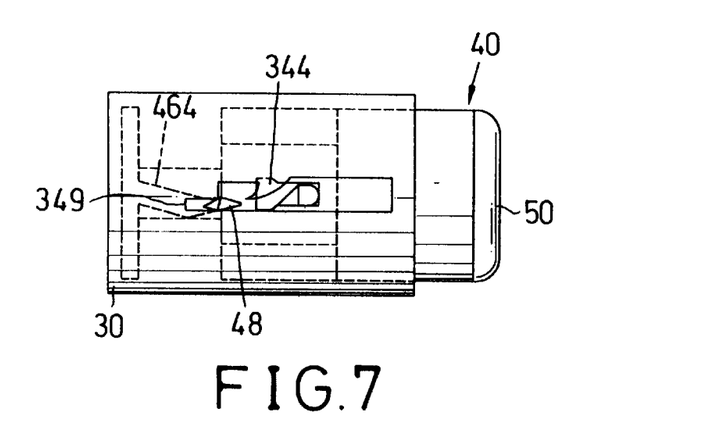
Figure 8:
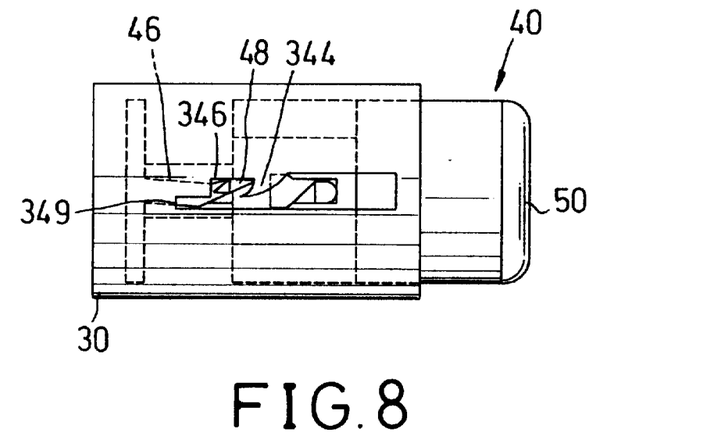
Figure 9:
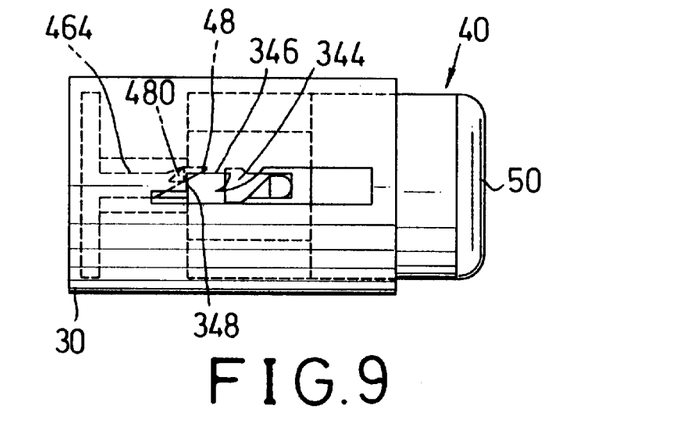
Figure 10:
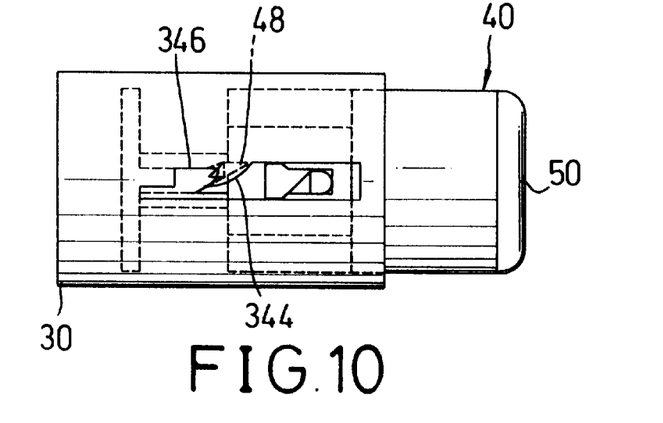

With reference to FIG. 5 and taking FIG. 3 for reference, because of the spring (52), the stop (444) engages the limiting end (342) of the limiting sleeve (30) and thus the guide (48) engages with a back face of the hook (344). When the pushbutton (50) is pressed, that is the state is changed from FIG. 5 to FIG. 6, the sliding movement of the guiding member (40) inside the limiting sleeve (30) deviates the guide (48) in the wide slot (340). Because the back face of the hook (344) forces the guide (48) to move axially in the narrow slot (346), the resilient plate (464) will move axially as well. Continuing pushing the pushbutton (50) will allow the guide (48) to leave the limit of the hook (344) and temporarily be received in the space (349). Meantime, the resilient plate (464) has the maximum deformation. When releasing the pushbutton (50), due to the spring (52), the pushbutton (50) moves backward relative to the limiting sleeve (30). With the restoration of the resilient plate (464), the guide (48) is held by the hook (344), as shown in FIG. 8. At this state, the guide (48) cannot return to the state illustrated in FIG. 5 and thus the close or open of the chamber (14) is accomplished. It should be noted that because of the width difference between the wide slot (340) and the narrow slot (346), even when the guide (48) is held by the hook (344), the resilient plate (464) is still deformed axially.

When the pushbutton (50) is pushed again from the state in FIG. 8, the inclined face (480) of the guide (48) engages the limiting block (348), which causes the guide (48) to go under the limiting block (348) and into the inner face of the limiting sleeve (30). After the guide (48) goes under the limiting block (48), there is nothing inside the limiting sleeve (30) to deform the resilient plate (464) and thus the resilient plate (464) will return to its original position. Therefore, after the pushbutton (50) a second time, the resilient plate (464) together with the guiding member (40) will be driven by the recoil force of the spring (52) away from the limiting sleeve (30), and the guide (48) will no longer be limited by the hook (344) when passing through the hook (344) due to the restoration of the resilient plate (464). Eventually, the stop (444) engages with the limiting end (342) again, as shown in FIG. 5, which constitutes a complete cycle of the actuation and de-actuation of the sprinkler.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An actuation mechanism of a sprinkler having an inlet for connected to a water source, an outlet selectively communicating with the inlet and a chamber defined to hold the actuation mechanism that controls the communication between the inlet and the outlet, the actuation mechanism comprising:

a pushbutton;

a guiding member having a pushbutton seat to be securely engaged with the pushbutton at one end and a connecting rod seat extending out from the other end of the pushbutton seat and having a connecting rod hole defined to hold one end of a connecting rod, an extension extending from the connecting rod seat and provided with a ring formed on a free end of the extension, the ring having a resilient plate extending toward the connecting rod seat;

a limiting sleeve having the guiding member slidably mounted in the limiting sleeve and a limit slot peripherally defined through the limiting sleeve to receive the resilient plate and the stop and to selectively deform the resilient plate axially relative to the limiting sleeve, a hook formed on one side face defining the limit slot to selectively hold the resilient plate in place, a limiting block formed on one end of the limit slot to selectively deform the resilient plate, whereby the slidable movement of the guiding member in the limiting sleeve actuates and opens or closes the sprinkler.

2. The actuation mechanism as claimed in claim 1, wherein the guiding member further has a guide integrally formed on a distal end of the resilient plate and an inclined face formed on a side face of the guide relative to the resilient plate so that the inclined face is able to engage a back face of the hook to bend the resilient plate, and the guide is able to engage the limiting block to force the resilient plate to deform to go under an inner face of the limiting sleeve.

3. The actuation mechanism as claimed in claim 2, wherein the limit slot is composed of a wide slot to receive the resilient plate together with the guide and the stop and a narrow slot with a width narrower than the wide slot to deform the resilient plate when the resilient plate enters the narrow slot.

4. The actuation mechanism as claimed in claim 3, wherein the limiting sleeve further has a longitudinal key formed on the inner face of the limiting sleeve, and the guiding member has a longitudinal keyway defined in the ring to correspond to the key so that when the guiding member and the limiting sleeve are assembled, there will be no relative rotation between the limiting sleeve and the guiding member.

5. The actuation mechanism as claimed in claim 4 further comprising:
- a tubular shell to receive both the guiding member and the limiting sleeve and having an open distal and proximal end, a flange formed on the distal end of the shell, an annular recess formed in an inner face of the flange, a positioning recess defined in the inner face of the flange and close to the distal end of the shell and an annular stop formed beside the annular recess;
- a first ring mounted in the annular recess;
- a positioning ring pressed into the positioning recess to firmly retain the first ring in the annular recess;
- an O-ring securely mounted around the shell and abutting the flange so when the tubular shell is assembled in the body of the sprinkler by an outer thread formed on an outer face of the tubular shell, the O-ring is able to provide the necessary seal;
- a cap covering the open proximal end and including a centrally defined hole with a step formed in an inner side face defining the hole to hold a washer inside the hole and an circular lip formed on one side of the cap to securely attach a cover.

6. The actuation mechanism as claimed in claim 4 further comprising a spring mounted in the limiting sleeve to provide a necessary recoil force to the guiding member to push the guiding member away from the limiting sleeve.

7. The actuation mechanism as claimed in claim 3 further comprising:
- a tubular shell to receive both the guiding member and the limiting sleeve and having an open distal and proximal end, a flange formed on the distal end of the shell, an annular recess formed in an inner face of the flange, a positioning recess defined in the inner face of the flange and close to the distal end of the shell and an annular stop formed beside the annular recess;
- a first ring mounted in the annular recess;
- a positioning ring pressed into the positioning recess to firmly retain the first ring in the annular recess;
- an O-ring securely mounted around the shell and abutting the flange so when the tubular shell is assembled in the body of the sprinkler by an outer thread formed on an outer face of the tubular shell, the O-ring is able to provide the necessary seal;
- a cap covering the open proximal end and including a centrally defined hole with a step formed in an inner side face defining the hole to hold a washer inside the hole and an circular lip formed on one side of the cap to securely attach a cover.

8. The actuation mechanism as claimed in claim 3 further comprising a spring mounted in the limiting sleeve to provide a necessary recoil force to the guiding member to push the guiding member away from the limiting sleeve.

9. The actuation mechanism as claimed in claim 2, wherein a space is defined in the limiting sleeve to temporarily receive therein the guide when the guide is about to be held in place by the hook.

10. The actuation mechanism as claimed in claim 9 further comprising:
- a tubular shell to receive both the guiding member and the limiting sleeve and having an open distal and proximal end, a flange formed on the distal end of the shell, an annular recess formed in an inner face of the flange, a positioning recess defined in the inner face of the flange and close to the distal end of the shell and an annular stop formed beside the annular recess;
- a first ring mounted in the annular recess;
- a positioning ring pressed into the positioning recess to firmly retain the first ring in the annular recess;
- an O-ring securely mounted around the shell and abutting the flange so when the tubular shell is assembled in the body of the sprinkler by an outer thread formed on an outer face of the tubular shell, the O-ring is able to provide the necessary seal;
- a cap covering the open proximal end and including a centrally defined hole with a step formed in an inner side face defining the hole to hold a washer inside the hole and an circular lip formed on one side of the cap to securely attach a cover.

11. The actuation mechanism as claimed in claim 9 further comprising a spring mounted in the limiting sleeve to provide a necessary recoil force to the guiding member to push the guiding member away from the limiting sleeve.

12. The actuation mechanism as claimed in claim 2 further comprising:
- a tubular shell to receive both the guiding member and the limiting sleeve and having an open distal and proximal end, a flange formed on the distal end of the shell, an annular recess formed in an inner face of the flange, a positioning recess defined in the inner face of the flange and close to the distal end of the shell and an annular stop formed beside the annular recess;
- a first ring mounted in the annular recess;
- a positioning ring pressed into the positioning recess to firmly retain the first ring in the annular recess;
- an O-ring securely mounted around the shell and abutting the flange so when the tubular shell is assembled in the body of the sprinkler by an outer thread formed on an outer face of the tubular shell, the O-ring is able to provide the necessary seal;
- a cap covering the open proximal end and including a centrally defined hole with a step formed in an inner side face defining the hole to hold a washer inside the hole and an circular lip formed on one side of the cap to securely attach a cover.

13. The actuation mechanism as claimed in claim 2 further comprising a spring mounted in the limiting sleeve to provide a necessary recoil force to the guiding member to push the guiding member away from the limiting sleeve.

14. The actuation mechanism as claimed in claim 1 further comprising:
- a tubular shell to receive both the guiding member and the limiting sleeve and having an open distal and proximal end, a flange formed on the distal end of the shell, an annular recess formed in an inner face of the flange, a positioning recess defined in the inner face of the flange and close to the distal end of the shell and an annular stop formed beside the annular recess;
- a first ring mounted in the annular recess;
- a positioning ring pressed into the positioning recess to firmly retain the first ring in the annular recess;
- an O-ring securely mounted around the shell and abutting the flange so when the tubular shell is assembled in the body of the sprinkler by an outer thread formed on an outer face of the tubular shell, the O-ring is able to provide the necessary seal;
- a cap covering the open proximal end and including a centrally defined hole with a step formed in an inner side face defining the hole to hold a washer inside the hole, and an circular lip formed on one side of the cap to securely attach a cover.

15. The actuation mechanism as claimed in claim 14 further comprising a spring mounted in the limiting sleeve to provide a necessary recoil force to the guiding member to push the guiding member away from the limiting sleeve.

16. The actuation mechanism as claimed in claim 1 further comprising a spring mounted in the limiting sleeve to provide a necessary recoil force to the guiding member to push the guiding member away from the limiting sleeve.

* * * * *